United States Patent
Yu et al.

(10) Patent No.: US 11,314,497 B2
(45) Date of Patent: *Apr. 26, 2022

(54) DEPLOYMENT AND CUSTOMIZATION OF APPLICATIONS AT THE WIDGET LEVEL

(71) Applicant: INTUIT INC., Mountain View, CA (US)

(72) Inventors: Jay Yu, San Diego, CA (US); Amit Arya, Mountain View, CA (US); Alexey Povkh, Mountain View, CA (US); Jeffery Brewer, Mountain View, CA (US); Elangovan Shanmugam, Mountain View, CA (US); Gaurav V. Chaubal, Mountain View, CA (US); Yamit P. Mody, San Diego, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,333

(22) Filed: Jun. 24, 2020

(65) Prior Publication Data

US 2020/0319872 A1 Oct. 8, 2020

Related U.S. Application Data

(63) Continuation of application No. 15/889,475, filed on Feb. 6, 2018, now Pat. No. 10,732,952.

(51) Int. Cl.
*G06F 8/61* (2018.01)
*H04L 67/00* (2022.01)
*G06N 20/00* (2019.01)

(52) U.S. Cl.
CPC .............. *G06F 8/64* (2013.01); *G06N 20/00* (2019.01); *H04L 67/34* (2013.01)

(58) Field of Classification Search
CPC ............ G06F 8/64; G06N 20/00; H04L 67/34
See application file for complete search history.

(56) References Cited

U.S. PATENT DOCUMENTS

| 8,429,103 | B1 | 4/2013 | Aradhye et al. |
| 8,856,670 | B1 * | 10/2014 | Thakur .................. G06F 9/451 715/765 |
| 9,405,427 | B2 * | 8/2016 | Curtis ................... G06F 3/0481 |

(Continued)

FOREIGN PATENT DOCUMENTS

WO 2015122691 A1 8/2015

*Primary Examiner* — Wei Y Zhen
*Assistant Examiner* — Brahim Bourzik
(74) *Attorney, Agent, or Firm* — Patterson & Sheridan, LLP

(57) ABSTRACT

This disclosure relates to customizing deployment of an application to a user interface of a client device. An exemplary method generally includes training a model based on historical context information of a plurality of users by identifying correlations between the historical context information and a plurality of widgets and storing the correlations in the model. The method further includes receiving context information from the client device. The method further includes determining a user intent based on the context information using the model. The method further includes selecting one or more widgets to include in a custom user interface definition based, at least in part, on the user intent. The method further includes transmitting, to the user interface of the client device, the custom user interface definition.

20 Claims, 7 Drawing Sheets

(56) References Cited

U.S. PATENT DOCUMENTS

| | | | |
|---|---|---|---|
| 10,564,988 B1* | 2/2020 | Jose | G06F 9/546 |
| 11,138,518 B1* | 10/2021 | Yu | G06F 8/38 |
| 2006/0195583 A1* | 8/2006 | Bellifemine | H04N 21/6582 |
| | | | 709/227 |
| 2007/0204125 A1 | 8/2007 | Hardy | |
| 2007/0250574 A1* | 10/2007 | Tseitlin | G06F 8/71 |
| | | | 709/205 |
| 2010/0262953 A1 | 10/2010 | Barboni et al. | |
| 2010/0313140 A1* | 12/2010 | Bank | G06F 16/337 |
| | | | 715/747 |
| 2011/0047540 A1* | 2/2011 | Williams | G06F 8/61 |
| | | | 717/178 |
| 2011/0106876 A1 | 5/2011 | Delaney et al. | |
| 2011/0295986 A1* | 12/2011 | Ferris | H04L 67/32 |
| | | | 709/222 |
| 2011/0296374 A1* | 12/2011 | Wu | G06F 40/216 |
| | | | 717/104 |
| 2013/0103790 A1* | 4/2013 | Gupta | G06F 9/44505 |
| | | | 709/217 |
| 2014/0089824 A1 | 3/2014 | George et al. | |
| 2015/0113504 A1 | 4/2015 | Artzi et al. | |
| 2016/0269509 A1 | 9/2016 | Dooley | |
| 2017/0078452 A1 | 3/2017 | Verrijt et al. | |
| 2017/0255455 A1* | 9/2017 | Collier | G06F 11/3438 |
| 2018/0075115 A1* | 3/2018 | Murray | G06F 16/2456 |
| 2018/0196653 A1* | 7/2018 | Srinivas | G06N 20/00 |
| 2018/0364879 A1 | 12/2018 | Adam et al. | |
| 2020/0183710 A1* | 6/2020 | Jose | G06F 8/65 |
| 2021/0019982 A1* | 1/2021 | Todd | G07F 17/3211 |

\* cited by examiner

DEPLOYMENT AND CUSTOMIZATION OF APPLICATIONS AT THE WIDGET LEVEL

CROSS REFERENCE TO RELATED APPLICATIONS

This application is a continuation of and hereby claims priority under 35 U.S.C. § 120 to pending U.S. patent application Ser. No. 15/889,475, filed on Feb. 6, 2018, the contents of which are incorporated herein in their entirety.

BACKGROUND

Field

Aspects of the present disclosure generally relate to techniques for custom deployment of software applications, and more specifically to deploying software applications across different platforms with user interfaces customized at the widget level based on context information.

Description of the Related Art

Software applications can be consumed on a variety of devices, including desktop computers, laptops, tablets, smartphones, and the like. These applications may be native applications (e.g., applications for which an executable file is built specifically for that platform), web components hosted in a native application, or web applications in which data provided by a user is processed remotely. In many cases, building applications targeting different platforms entails the use of platform-specific code monoliths which include code for generating a user interface and application logic tightly bound to the user-interface code. In some cases, applications targeting a common platform do not work on every device implementing the common platform, resulting in developers having to write application logic that accommodates different devices on the common platform.

As the number of applications targeting different platforms and applications supporting variations on a common workflow increases, the difficulty in providing a different version of the same application for each device increases. For example, a set of tax preparation applications perform the same general task of preparing a user's taxes, but a variety of discrete software artifacts may exist for variations on the workflow (e.g., one artifact may execute a workflow for preparing a simple tax return for a taxpayer in the United States, another artifact may execute a workflow for preparing a complex tax return for a taxpayer in the United States, another artifact may execute a workflow for preparing a simple tax return in Canada, and the like). While these applications may perform the same general task (e.g., of tax preparation) and may share a significant amount of code, each application may also implement custom code dedicated to performing a task according to each device.

Because these applications may implement a combination of custom and shared application logic that is bound to the user interface of the application, building and maintaining these applications generally requires large amounts of developer time. For example, if a common code component is modified, development teams may need to verify that the modification to the common code component does not adversely affect the operation of applications that use the common code component (e.g., render custom code components in a specific application unusable or otherwise modify the functionality of the custom code components). Further, as new variants of a workflow are identified, additional applications may be built, which adds to the universe of applications to be maintained.

Therefore, there is a need for systems that reduce the amount of time needed to develop, update, and deploy applications across different computing platforms.

SUMMARY

One embodiment of the present disclosure relates to a method for customizing deployment of an application to a user interface of a client device. The method generally includes training a model based on historical context information of a plurality of users by identifying correlations between the historical context information and a plurality of widgets and storing the correlations in the model. The method further includes receiving context information from the client device. The method further includes determining a user intent based on the context information using the model. The method further includes selecting one or more widgets of the plurality of widgets to include in a custom user interface definition based, at least in part, on the user intent. The method further includes transmitting, to the user interface of the client device, the custom user interface definition.

Another embodiment provides a computer-readable storage medium having instructions, which, when executed on a processor, performs an operation for customizing deployment of an application to a user interface of a client device. The operation generally includes training a model based on historical context information of a plurality of users by identifying correlations between the historical context information and a plurality of widgets and storing the correlations in the model. The operation further includes receiving context information from the client device. The operation further includes determining a user intent based on the context information using the model. The operation further includes selecting one or more widgets of the plurality of widgets to include in a custom user interface definition based, at least in part, on the user intent. The operation further includes transmitting, to the user interface of the client device, the custom user interface definition.

Still another embodiment of the present invention includes a processor and a memory storing a program, which, when executed by the processor, performs an operation for customizing deployment of an application to a user interface of a client device. The operation generally includes training a model based on historical context information of a plurality of users by identifying correlations between the historical context information and a plurality of widgets and storing the correlations in the model. The operation further includes receiving context information from the client device. The operation further includes determining a user intent based on the context information using the model. The operation further includes selecting one or more widgets of the plurality of widgets to include in a custom user interface definition based, at least in part, on the user intent. The operation further includes transmitting, to the user interface of the client device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Figure 1:
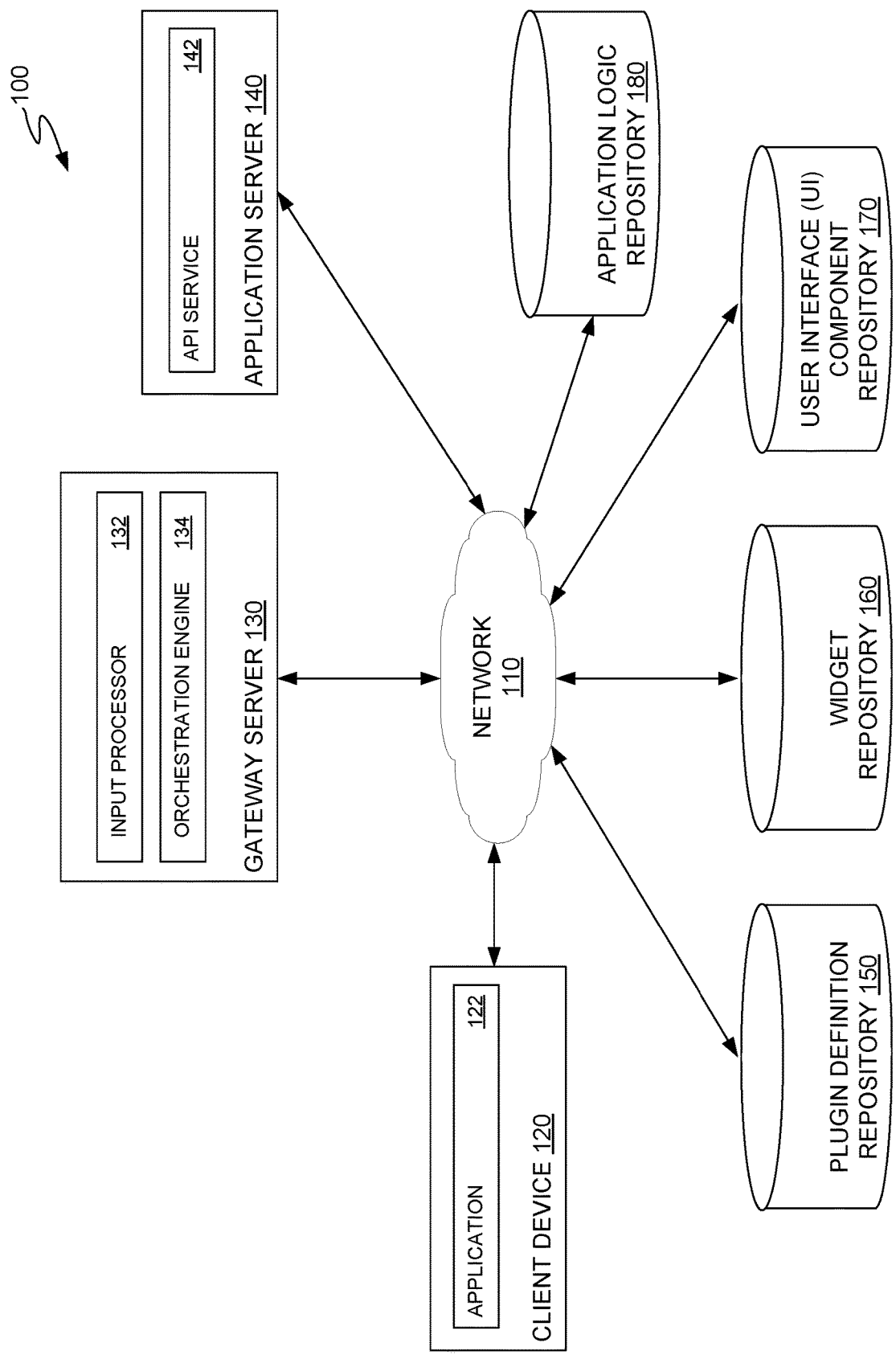
FIG. 1 illustrates an exemplary computing system in which custom user interfaces are dynamically generated and deployed to client devices executing a cross-platform application, according to one embodiment.

Embodiments of the present disclosure may allow user interfaces of an application to be customized at the widget level based, for example, on context information from a client device on which the application is deployed. Context information may describe a context in which the client device accesses the application, including characteristics of the client device, characteristics of a user of the client device, historical behavior of the user, and the like. For example, context information may include browsing information, search information, clickstream information, user preferences information, user profile information, geographic location information, device type and capability information, platform information, and the like. A widget may comprise a collection of user interface elements to render on client device to enable a user complete an application workflow step, such as enable a user to input data into the application or receive output data from the application.

Customizing a user interface at the widget level may, for example, involve selecting one or more widgets for display to a user based on a determination that the one or more widgets are likely to be relevant to the user (e.g., using context information). Techniques described herein may involve the use of historical data (e.g., from a plurality of users) and/or predefined rules to determine widgets likely to be relevant. User intent (e.g., the widgets which the user is interested in viewing, or which are relevant to the user) may be determined based on the context information, relevant widgets being identified in order of relevance using a model.

In certain embodiments, the model may be trained based on historical data to identify user intent and determine relevant widgets, ordering the widgets appropriately for display based on relevance. The model may be trained "offline", meaning prior to run-time. In some embodiments, for example, the model is trained using machine learning algorithms that identify statistical correlations between certain widgets and aspects of the context information of the plurality of users from the historical data. The model may, for example, store associations between certain user segments (e.g., users of the plurality of users who have certain combinations of browsing, search, and/or clickstream information, user preferences, user profile information, geographic location information, and the like) and widgets which those user segments historically interacted with. For example, the model may store associations which indicate that certain user segments have certain user intent, meaning that users in the user segments have the intent of interacting with certain widgets. The model may then be used at run-time to determine user intent and identify widgets relevant to a user based on context information of the user, such as by using a similarity metric to determine the user's similarity to the user segments associated with widgets in the model. Relevant widgets may then be provided in order of relevance to the user as part of a user interface definition which defines a step of a workflow to be presented to the user.

Aspects of the present disclosure generally provide cross-platform customizable software applications which decouple user interface components and application logic from one another. Decoupling user interfaces and application logic allows cross-platform applications to be delivered to a variety of end-user devices under a plurality of different customization contexts using an easily-maintainable code base. Further, decoupling user interfaces and application logic may allow for the use of common user interface components across different platforms, which may provide a unified user experience for an application regardless of the platform on which a user executes the application.

Because user interfaces and application are decoupled, changes made to application logic generally do not affect the definition and operation of a user interface. Conversely, changes to a user interface generally do not affect application logic invoked by the user interface. More generally, decoupling application logic from user interfaces allows mobile, web, and desktop applications to be deployed using a single code base. Further, because user interfaces and application logic are decoupled, modifications to either or both a user interface or application logic can be tested and deployed quickly and with a limited amount of testing, as changes to one generally do not affect the other.

FIG. 1 illustrates an exemplary computing system, according to one embodiment. As illustrated, computing system 100 includes a client device 120, a gateway server 130, an application server 140, a plugin repository 150, a widget repository 160, a user interface (UI) component repository 170, and an application logic repository 180, connected via network 110.

Client device 120 is included to be representative of a desktop computer, a laptop, a tablet, a smartphone, or any other computing device. As illustrated, client device 120 generally executes one or more applications 122. Application 122 communicates with gateway server 130 and application server 140 to obtain a user interface for the application and provide data to the application server for processing. In one example, application 122 executes a multi-step workflow where each step of the workflow is displayed as a set of interface components that are built dynamically based, at least in part, on the type of device, current state of the application, and/or other context information.

In some cases, the user interface definition may include web-based user interface elements, which may be shared across different platforms and allow for a common user interface to be generated across multiple platforms, as well as native user interface elements. In one embodiment, the collection of user interface elements may be selected based on a particular platform or device, based on an application state, such as a completion state of a workflow, and/or based on context information, such as user preferences, clickstream data, user profile information, and the like. For example, a user interface definition for a step of a tax preparation workflow may include a combination of web-based user interface elements from user interface component repository 160 (e.g., used to allow a user to enter form data) along with native user interface components that allow a user to capture data using capabilities of the client device (e.g., capture and process data from a camera at client device 120). In another tax preparation workflow step, for example where a user is asked to identify deductions the user is entitled to claim, the user interface definition may identify a number of web-based user interface elements from user interface component library to render in application 122.

In some embodiments, native code components may also be included in a user interface definition to take advantage of functionality provided by the operating system executing on client device 120. For example, native code components may be referenced in a user interface definition that generates notifications (e.g., to be displayed to the user) related to application 122. In other examples, native code components can be referenced in a user interface specification to allow, for example, users to provide voice and video data to application 122, such as to allow a user to engage in video chats with other users or live support representatives using application 122.

As a user interacts with application 122, application 122 may transmit user-provided data and context information to gateway server 130 or application server 140 for processing. The application state information may include the current version of a user interface specification (widget definitions and/or updated rules for processing user-provided data) for a specific step of a workflow cached at client device 120, the current step of the workflow executing in application 122, and a variation of the application a user is executing (e.g., the version of the application specific to a geographical region that client device 120 is executing application 122 in). When a user submits data to gateway server 130 and/or application server 140, application 122 may invoke a specified function in the user interface definition according to the data elements specified as inputs to the specified function. In response to transmitting data to gateway server 130 and/or application server 140, application 122 generally receives a new user interface definition identifying the present step of the workflow, the user interface elements to be displayed on client device 120, and the function(s) to be invoked upon completion of data entry for the present step of the workflow.

Gateway server 130 generally receives user input from client device 120 and generates a user interface definition for the client device to display user interface elements for the next step of a workflow based on the received user input. As illustrated, gateway server 130 includes an input processor 132 and an orchestration engine 134.

Input processor 132 generally receives user-provided data from application 122 (e.g., form input), an indication of the next step to be performed in a workflow executing in application 122, and other context information from client device 120 for processing. Input processor 132 generally invokes one or more functions provided by API service 142 and identified in the user-provided data. Input processor 132 examines any other data provided by client device 120 to generate a user interface definition for client device 120 including, for example, one or more plugins from plugin repository 150, which may comprise one or more widgets from widget repository 160.

As used herein, a plugin generally refers to a collection of widgets that client device 120 and/or application server 140 can use to implement a step in a workflow. A plugin may reference one or more functions defined in API service 142 that are invoked to complete the workflow step. Each widget may define a collection of user interface elements to render on client device 120 to complete a workflow step or to enable a user to input data into application 122. The plugin may identify a collection of widgets to implement on client device 120, application logic associated with the plugin, a list of functions the plugin can invoke, for example via API service 142, permissions associated with the plugin, behaviors of the plugin, intended interactions with other parts of a service, and the like. Each plugin may be versioned as the widget definitions and/or application logic associated with a plugin are updated. Notably, while widgets may be organized via plugin definitions, widgets may also be implemented independently of plugins, such that a user interface definition for client device 120 comprises one or more widgets to be displayed on client device 120.

In some cases, input processor 132 may receive information about the current version of a user interface definition, a plugin, and/or a widget cached at client device 120. If input processor 132 determines, for example, that a current version of a plugin in plugin definition repository 150 or a widget in widget repository 160 matches the version of the plugin or widget cached at client device 120, input processor 132 can indicate to client device 120 to render the user interface associated with the next step in the workflow using the cached versions of the plugin and/or widget because the cached versions of the plugin and/or widget are the most current versions. Further, input processor 132 may determine whether the plugins and/or widgets cached at the client device are consistent with a current user interface definition associated with the cached plugins and/or widgets. For example, in some cases a cached widget may still be the most current version, but the user interface definition may have changed to reference a different widget.

If input processor 132 determines that the current version of a user interface definition, a plugin, or a widget cached at client device 120 is outdated, no longer relevant, or does not exist at client device 120, input processor can invoke orchestration engine 134 to generate an appropriate user interface definition for an associated step of a workflow. In some cases, input processor 132 may invoke orchestration engine 134 with information identifying the step of the workflow, device-specific information (e.g., device type, operating system, whether the application is a native application or is executing in a web-based shell, and other device-specific information), and/or context information.

Orchestration engine 134 may be configured to generate a user interface definition using information received from client device 120 and to thereafter transmit the user interface definition to client device 120 for rendering and execution by application 122. To generate the user interface definition, orchestration engine 134 uses, for example, the information identifying requested relevant step of a workflow and context information to identify one or more plugins and/or widgets to implement the relevant user interface at client device 120. Orchestration engine 134 may transmit a user interface definition to client device 120 that specifies, for example, an order in which to display the widgets to a user (e.g., based on relevance to the user). The user interface definition transmitted to client device 120 by orchestration engine 134 may reference web-based user interface components, user interface components shared across different platforms, user interface components belonging to a specific platform, and/or one or more functions that can be invoked by the user interface. For example, the various components defined by the user interface definition may enable application 122 to receive and commit data to one or more data stores on client device 120, to transmit data to application server 140 for processing, or to route user-provided data to one or more expert systems for analysis (e.g., to guide a user through a workflow).

A user interface definition may references one or more functions that can be executed through the generated user interface, but may not include the code for executing the one or more functions. Thus, the user interface and the application logic (e.g., application code) for performing a task may be decoupled. Thus, a developer may design and implement a user interface definition that is customized for the client device without having to modify underlying application logic for application 122. This decoupling, therefore, makes the process of implementing various applications on different platforms far more efficient as compared to the traditional method of developing code monoliths for each and every platform. The platform-specific user interfaces (defined by associated user interface definitions specific to each platform) interacts with "backend" application logic that need not be updated for each platform and, similarly, when updated, is updated for all platforms at a time (because the application logic is not tied to a particular platform). Thus, common application components need not be duplicated, updated, and tested for device-specific and user-specific versions of the same application. Changes in application logic (e.g., to support new variations of a workflow, to modify how data is processed at a specific step in a workflow in response to changes in relevant law, and the like) generally do not affect the functionality of a generated user interface, and updated application logic may be executed by client devices without building discrete software artifacts with the updated application logic.

For example, suppose that application 122 is a tax preparation application executing on a mobile device and that the user of client device 120 is attempting to provide wage income data to application 122. Orchestration engine 134 may identify multiple widgets that can be executed on client device 120 to allow a user to import wage income data into application 122. For example, one widget may allow a user to capture one or more images of a document (e.g., as still images or a live stream from a camera integrated into or otherwise connected to client device 120) and provide the data extracted from the document to API service 142 of application server 140. Because this widget interfaces directly with device-specific capabilities, this widget may include references to device-specific (native) logic and user interface elements tied to image capture and data extraction. Meanwhile, another widget may generate a form used to input data. Orchestration engine 134 may generate the platform-specific user interface definition including references to both the image capture widget (with the native code components needed to interact with the device-specific functionality) and the form entry widget (with a form layout definition for the one or more data entry boxes to be displayed to the user) and transmit the user interface definition to client device 120 for execution.

In another example, suppose that application 122 is an accounting application executing on client device 120 and that a user of client device 120 is entering information from paper invoices into an accounts payable or accounts receivable account in the accounting application. Application 122 can reuse the image capture widget discussed above to extract workflow-specific data from a captured image of a document and provide the workflow-specific data to application server 140, which may host the backend accounting application logic.

In another example, suppose that application 122 is a financial services web application executing on a mobile device and that the user of client device 120 is attempting to view its credit score. Client device 120 provides orchestration engine 134 with context information comprising clickstream data, which indicates that the user accessed application 122 by clicking on a link related to checking the user's credit score. Orchestration engine 134 may determine that, based on the context information, a credit score widget is relevant to the user, and may thereafter generate a user interface definition containing a credit score widget. Orchestration engine 134 may then send the user interface definition to client device 120, which thereafter displays the credit score widget to the user. In certain embodiments, orchestration engine 134 may also determine that additional widgets are relevant to the user, and may add these to the user interface definition.

Application server 140 generally hosts application logic one or more applications and associated application programming interfaces (API) service 142, which allows, for example, application 122 to invoke the functionality of the application hosted on application server 140.

In some cases, API service 142 validates queries from remote devices. For example, when API service 142 receives a query from application 122 on client device 120, API service 142 can verify that the received query is valid. In some cases, where API service 142 provides functions based on a graph schema, API service 142 can traverse a graph projection of the API to verify that a received query is valid. If API service 142 determines that the received query is valid, API service 142 invokes the function specified in the query.

Plugin definition repository 150 generally stores plugin definitions defined for a specific workflow step. As discussed above, these plugin definitions generally reference one or more widgets defined in widget repository 160 and one or more functions provided by API service 142 that may relate to application logic stored in application logic repository 180. Plugin definition repository 150 may be a versioned repository, and plugin version data may be updated as the configuration of a plugin (e.g., widgets used by the plugin, functions referenced by the plugin, and the like) changes.

Widget repository 160 generally stores data defining widgets that can be included in one or more plugins defined in plugin definition repository 150 or that can be added to one or more user interface definitions. As described above, each widget stored in widget repository 160 may be defined as a set of user interface components configured to implement various aspects of a workflow step.

User interface component repository 170 generally stores data defining common user interface components that may be used by one or more widgets to implement a user interface on client device 120. In some cases, user interface component repository 170 may store user interface components that can be used across different computing platforms (e.g., web, native mobile, desktop/laptop, native tablet, and the like) and user interface components that may be specific to a particular platform (e.g., user interface components corresponding to image capture prompts, voice capture prompts, and the like on different platforms).

Application logic repository 180 generally provides a versioned repository containing application logic, such as application code, code contracts, and other code artifacts, for implementing various workflow steps displayed on client device 120 and processed by application server 140. The application logic in application logic repository 180 may be associated with one or more functions that a user can invoke through interaction with the one or more user interface components specified in a user interface definition and associated with a plugin associated with a step in the workflow. A code contract may define, for example, the name of a function that a user can invoke, the required inputs for the function, optional inputs that may be, but are not required to be, provided in an invocation of the function, and the output generated by the function.

It is noted that, while gateway server 130 and application server 140 are shown separately, the functions of these entities may alternatively be combined into a single entity.

Figure 2:
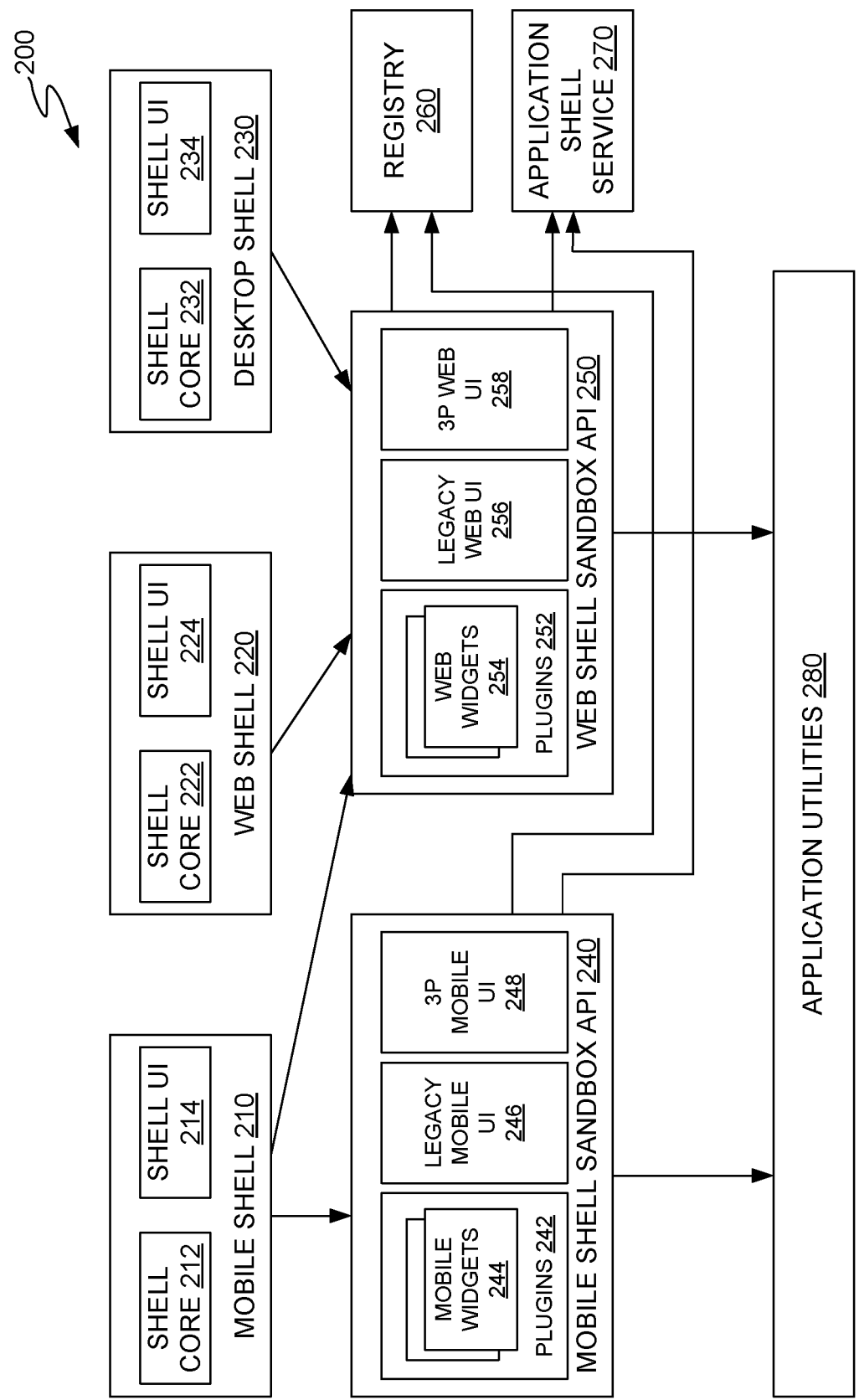
FIG. 2 illustrates an exemplary architecture in which user interfaces are dynamically generated and deployed to client devices executing a cross-platform application, according to one embodiment.

FIG. 2 illustrates an example of a system architecture 200 for dynamically generating and deploying user interfaces in cross-platform applications. While the description of FIG. 2 focuses on web widgets as a non-native type of widget, the same concepts apply to other non-native widgets such as framework-based widgets.

As illustrated, system architecture 200 generally includes a mobile shell 210, a web shell 220, and a desktop shell 230, each of which may communicate with one or more shell sandbox APIs, such as the mobile shell sandbox API 240 and the web shell sandbox API 250, to access application utilities and other capabilities provided by a shell runtime, as discussed in further detail herein.

Each shell 210, 220, and 230 may allow for the dynamic generation of customized user interfaces and user experiences for applications (e.g., application 122 from FIG. 1) hosted by the shell. For example, shells 210, 220, and 230 may implement a variety of relevant plugins and/or widgets, as discussed above. The plugins and/or widgets implemented by a shell (e.g., 210, 220, or 230) for display on a client device may be selected based on the context in which a user is executing an application (e.g., a step in a workflow that the user is currently executing, the next step in the workflow that the user may be expected to execute, and so on) and, in some embodiments, the type of device on which the user is executing the application. Each shell may be made available (e.g., via one or more data repositories) as a library that may be semantically versioned (e.g., versioned using a three part version number, such as 1.2.3, representing a major version, a minor version and a patch, respectively).

Native mobile applications may include the mobile shell 210 as a library and package the mobile shell 210 as part of the application. The web shell 220 may be hosted by an application server, such as application server 140 in FIG. 1, for a specific software product and may be deployed such that applications and widgets built on the web shell 220 are continually integrated and updated. In some aspects, the native desktop shell 230 may use similar components as the web shell 220, because the native desktop shell 230 may be configured to encapsulate a web interface to deliver a software product to a user.

The shells 210, 220, and 230 may use consistent application programming interfaces (APIs) across platforms. While the implementation of API functions may differ between shells 210, 220, and 230, the APIs may be defined according to consistent code contracts that define required inputs, optional inputs, and required outputs for each function provided by the API. The inputs and outputs may be defined, for example, as a variable name and a variable type indicating a data type associated with each named variable to be provided as input into a function or generated as an output by the function. To promote code reuse across the shells 210, 220, and 230, cross-platform code (e.g., code written in JavaScript, PHP, or other languages that can be executed in various computing environments with similar execution results) may be used to implement the shells 210, 220, and 230. In some aspects, each of the shells 210, 220, and 230 may include functionality tailored to the unique capabilities of each platform.

Each shell 210, 220, and 230 may allow for the creation of dynamic user interfaces and user experiences customized for a particular user by combining native and non-native user interface components from a variety of relevant plugins, as discussed above. The plugins selected by a shell 210, 220, or 230 may be selected based on the context in which a user is executing an application (e.g., a step in a workflow that the user is currently executing, the next step in the workflow that the user may be expected to execute, and so on) and, in some embodiments, the platform on which the user is executing the application.

In some aspects, plugins 242 and 252 may be modular, self-contained software components of an application that provide specific features of the application. Examples of plugins may include navigation bars that allow a user to move between different steps of a workflow executed within an application, progress bars that display an amount of the workflow that a user has completed (and correspondingly an amount of the workflow that remains to be completed), application-specific features, features that leverage hardware present on the computing device on which the application is executing (e.g., image capture using one or more cameras integrated into a client device, authentication using one or more biometric data capture devices integrated into a client device, etc.). Because each plugin may be self-contained, applications may be decomposed into a plurality of independently maintainable components (i.e., independently debugged, updated, extended, etc.).

Each plugin (e.g., 242 or 252) may include two parts: a configuration and one or more widgets. The configuration generally identifies the widgets included in the plugin, a code contract, permissions, the behavior of the plugin, and intended interactions with other widgets or an application (e.g., application 122 in FIG. 1). In some embodiments, legacy code components (e.g., code components that were created for previous versions of a software product and are intended to be reused in a cross-platform application) and third-party components (e.g., extensions to an application) may be included in a plugin to be compatible with a platform. The user interfaces associated with legacy components or third-party components may be implemented as a widget that can be loaded into a shell, such as shells 210, 220, and/or 230.

Each plugin (e.g., 242 and 252) and widget (e.g., 244 and 254) may be registered in a central configuration service, such as registry 260. Registry 260 represents a centrally managed service that manages the plugin and widget configurations that may be used by applications hosted in shells 210, 220, or 230 to provide customized user experiences (e.g., a particular set of widgets) based on context information. The registry 260 generally may be responsible for delivering applicable configuration data for a specific application. Registry 260 may be representative of functionality described with respect to plugin definition repository 150, widget repository 160, and UI component repository 170 in FIG. 1.

Mobile shell 210 generally is an application that executes on a mobile device (e.g., a smartphone, handheld computer, or tablet computer) and integrates web-based user interfaces (UIs) and native mobile UIs to create a customized application that is tailored to the capabilities of the mobile device on which mobile shell 210 executes. To integrate web-based UIs and native mobile UIs, an instance of web shell 220 may be integrated into mobile shell 210 at runtime (not shown). UI components that are executed as a web component (e.g., web forms, hypertext markup language (HTML) UI elements, and the like) may be executed within the web shell 220. The mobile shell 210 can additionally leverage device-specific capabilities using native mobile UIs and code components.

The web shell 220 integrated into the mobile shell 210 can delegate one or more actions to the mobile shell 210 via a programmatic bridge, thereby allowing applications executed within the mobile shell 210 to be customized and optimized for different kinds of mobile devices. In one example, customization and optimization of an application executing in the mobile shell 210 may include the use of different image capture widgets based on the capabilities of a mobile device on which the mobile shell 210 is executing.

Shells 210, 220, and 230 may host a variety of applications that share user interface components (e.g., widgets and plugins) to implement different functionalities. To reduce the storage and memory footprint of an application hosted within a shell, shells 210, 220, and 230 may load widgets based on the application hosted within the shell. For example, a tax preparation application may load a first set of widgets (e.g., tax liability/refund calculators, a completeness engine, tax support modules, emotional response modules, and the like). An accounting application, on the other hand, may load a different set of widgets (e.g., credit/debit calculators, statement generators, and the like), as the functionality of the accounting application does not depend on the same widgets as the tax preparation application.

Shells 210, 220, and 230 may provide a widget specification. The widget specification generally is a platform-neutral description of UI widgets. The widgets that are loaded into shells 210, 220, and 230 generally do not depend on the specific implementation of a shell 210, 220, or 230. Rather, the widgets may depend on a sandbox application programming interface (API) provided by a shell. For example, the web shell sandbox API 250 may be a common sandbox for all cross-platform widgets. As illustrated in FIG. 2, mobile shell 210 provides a mobile shell sandbox API 240 and a web shell sandbox API 250, while web shell 220 and desktop shell 230 provide the web shell sandbox API 250. Providing shell sandbox APIs 240 and 250 may enable widgets to access shell services, such as common capabilities, application context, authentication, and the like.

In some embodiments, application-specific monoliths (e.g., code for generating a user interface and application logic) that are not cross-platform compatible may be decomposed into a plurality of widgets that may be hosted within a shell 210, 220, or 230. To allow application-specific monoliths (or components of an application-specific monolith) to be executed within a shell 210, 220, or 230, the shells 210, 220, and 230 can execute an application-specific monolith or components of an application-specific monolith in a sandbox widget (not shown). The sandbox widget allows for the execution of legacy code within a shell 210, 220, or 230 that conforms to the functionality, calling conventions, and code execution rules enforced by the sandbox API (e.g., 240 and/or 250). The sandbox widget generally delegates tasks to legacy code that implements the application-specific monolith, but provides the functionality of the widget in a manner that conforms to the code contracts established for communications between plugins and widgets in the shells (210, 220, or 230). As application-specific monoliths are transitioned to widgets and plugins, usage of the sandbox implementation of application-specific monoliths may be discontinued. For example, mobile shell sandbox API 240 allows legacy mobile user interface components 246 as well as third-party mobile user interface components 248 to interact with mobile shell 210.

Shells 210, 220, and 230 additionally provide mechanisms to enable widgets to communicate with other widgets. The communications mechanisms provided by a shell (e.g., within shell core 212, 222, and 232) may provide for asynchronous communications between different widgets. These communications may be, in some cases, event driven (e.g., triggered when some condition occurs within an application, such as user interaction with a graphical user interface component, expiration of a timer, etc.). In some cases, asynchronous communications between different widgets may be supported via communications channels between the widgets.

For login and user authentication, shells 210, 220, and 230 may include widgets for username/password authentication, biometric authentication, possession-based authentication, or a combination of authentication methods (multi-factor authentication). Biometric authentication widgets may interact with a variety of authentication data capture devices on a client device, such as front-facing cameras on tablets or smartphones, web cameras on laptop or desktop computing devices, fingerprint readers, iris scanners, or other biometric devices for user authentication to allow for user enrollment and authentication.

As illustrated, each shell 210, 220, and 230 includes a shell core 212, 222, and 232, respectively, and a shell user interface 214, 224, and 234, respectively. The shell cores 212, 222, and 232 may include a shell kernel that manages the lifecycle of an application hosted within a shell 210, 220, or 230 and the shell user interface 214, 224, or 234 rendered according to a platform-specific workflow definition. Lifecycle management generally includes initialization of an application, termination of an application, deferring of actions, pausing of an application (e.g., when an application is minimized or otherwise placed in a suspended state), state recovery (e.g., when an application is maximized or otherwise reactivated from a suspended state), and the like. The shell cores 212, 222, and 232, may further provide support for plugin/widget management, event handling, asynchronous communications, and shell extension and customization.

Shell user interfaces 214, 224, and 234 render user interfaces dynamically based on client device information and the workflow that a user is executing. Shell user interfaces 214, 224, and 234 provide layout and navigation management, flow control (e.g., to control the transition from one step to another step of a workflow implemented by an application hosted in shells 210, 220, or 230), user login/authentication, and the like. Shell user interfaces 214, 224, and 234 may be a barebones (or blank) user interface. Applications hosted within a shell 210, 220, or 230 can populate shell user interfaces 214, 224, 234 with the graphical user interface components that enable a user to perform one or more tasks. Applications using a shell user interface 214, 224, or 234 generally define the user experience, which allows for application development teams of each shell UI to customize the user experience for the specific platform and application hosted within a corresponding shell 210, 220, or 230.

As illustrated, shell sandbox APIs 240 and 250 allow for execution of a variety of plugins and widgets in applications hosted by shells 210, 220, and 230. The specific plugins and widgets in sandbox APIs 240 and 250 may be determined based on a type of device being used (e.g., native mobile widgets may be executed using mobile shell sandbox API 240, while web widgets may be executed using web shell sandbox API 250). As illustrated, mobile shell sandbox API 240 supports the execution of plugins 242, including one or more mobile widgets 244, a legacy mobile UI 246 (e.g., a UI associated with legacy code monoliths implemented as a widget that can be loaded into a shell 210, 220, and/or 230 of architecture 200), and third-party mobile UIs (e.g. 248) associated with extensions to one or more applications. Web shell sandbox API 250, which may be leveraged by any of mobile shell 210, web shell 220, and desktop shell 230 for the execution of web-based widgets, supports the execution of plugins 252, including one or more web widgets 254, a legacy web UI 256 associated with legacy code monoliths implemented as a widget that can be loaded into a shell (e.g. shells 210, 220, and/or 230) of architecture 200, and third-party web UIs (e.g., 258) associated with extensions to one or more web applications. Third-party UIs 248 and 258 may be developed and deployed by other developers for integration into one or more software product offerings that may be executed within a shell 210, 220, or 230.

Shell sandbox APIs 240 and 250 may provide mobile widgets 244 and web widgets 254 access to application utilities 280 and common capabilities. The application utilities 280 and common capabilities may be provided by a shell runtime. These utilities and common capabilities may include, for example, activity logging, analytics, authorization context tracking, application context tracking, and so on. The shell sandbox APIs 240 and 250 may provide a versioned public code contract that defines how different widgets and plugins, regardless of whether a widget or plugin is a first-party widget or plugin or a third-party widget or plugin, interact with the sandbox and the functionality provided by shell sandbox APIs 240 and 250. At runtime, shells 210, 220, and 230 can create an instance of a sandbox and make the sandbox available to widgets at runtime.

As discussed, application utilities 280 may be provided to widgets and plugins via one of shell sandbox APIs 240 or 250. In some cases, an application shell service 270 may manage initializing each shell by orchestrating between a registry 260 and platform services for the relevant data to initialize the shell, which may be customized for a specific application and platform (e.g., for an application on a mobile or desktop/laptop computers or implemented on the web).

Figure 3:
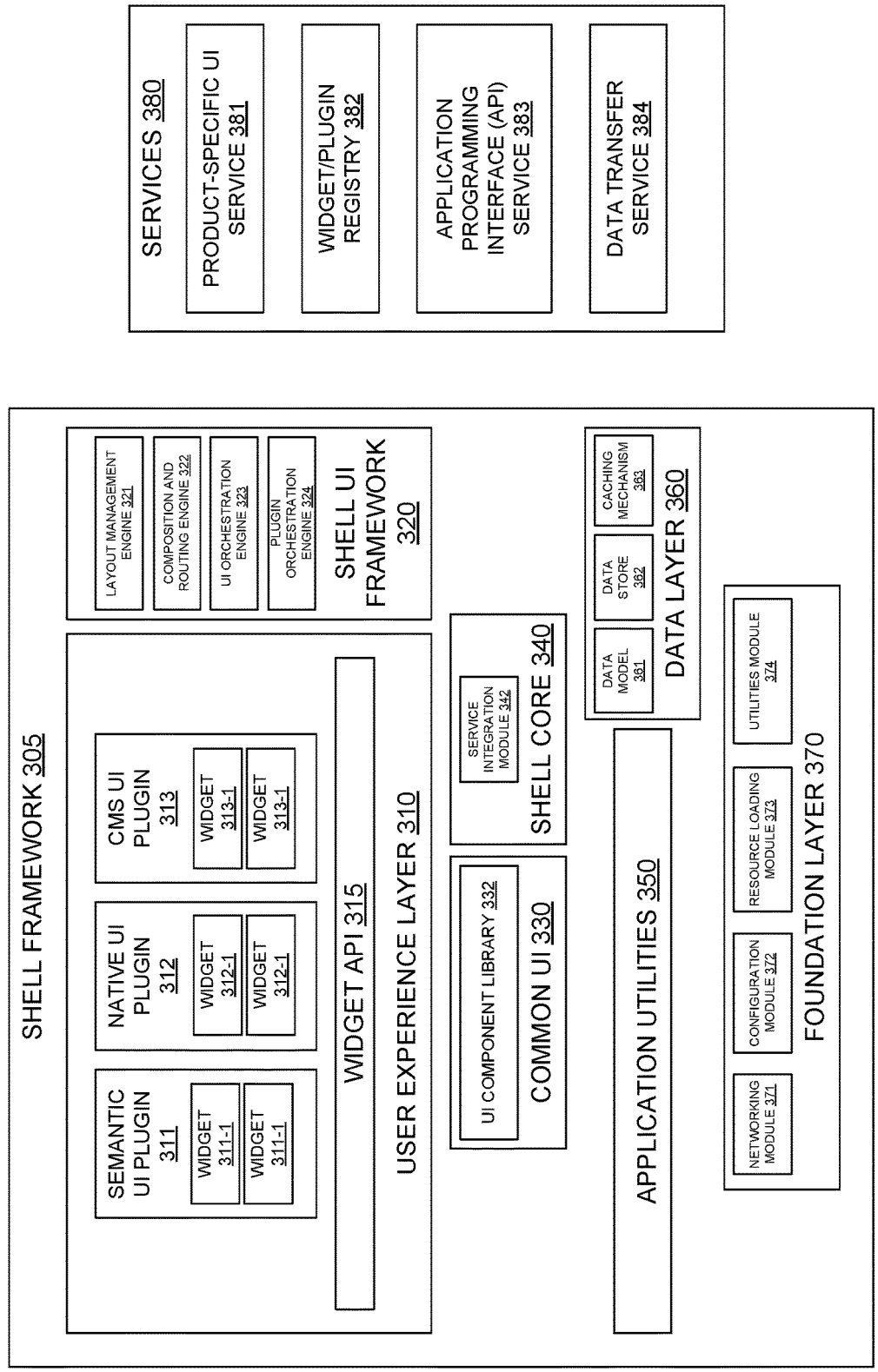
FIG. 3 illustrates an exemplary shell framework architecture for dynamically generating and deploying user interfaces to client devices executing a cross-platform application, according to one embodiment.

FIG. 3 illustrates an example shell architecture 300 for dynamically generating and deploying user interfaces in cross-platform applications. As illustrated, shell architecture 300 generally includes an application shell framework 305 and services 380. Shell architecture 300 may be representative of an architecture for shells 210, 220, and 230 in FIG. 2.

Shell framework 305 generally performs functions related to the dynamic generation of user interfaces for applications comprising widgets selected based on user context, device information, and so on. As illustrated, shell framework 305 includes a user experience layer 310, a shell user interface framework 320, a common user interface layer 330, shell core 340, application utilities 350, data layer 360, and foundation layer 370.

User experience layer 310 generally hosts a plurality of plugins 311, 312, 313, and a widget application programming interface (API) 315. Semantic UI plugin 311 generally contains a plurality of cross-platform widgets 311-1 that are semantically applicable to various platforms. The cross-platform widgets 311-1 generally are widgets that may be rendered on a variety of computing devices (e.g., smartphones executing various operating systems, desktop computers, laptop computers, tablets, etc.) in either native application shells or a web shell executable within a web browser.

Native UI plugin 312 generally hosts a plurality of device-specific widgets 312-1 that may implement a variety of device-specific features.

Content Management System (CMS) UI plugin 313 generally hosts a plurality of widgets 313-1 that are used to implement a content management system within an application hosted within a shell. These CMS widgets 313-1, for example, provide document versioning, document tracking, and other services that can be used to manage documents uploaded and created by an application.

Widget API 315 generally provides an interface to the various widgets included in the one or more plugins 311, 312, and 313, to allow the widgets to access one or more tools hosted in the shell core 340 and/or application utilities 350, access data layer 360, or interact with device hardware through foundation layer 370.

Shell UI framework 320 generally implements one or more engines that aid in rendering a user interface on a device. As illustrated, shell UI framework 320 generally includes a layout management engine 321, composition and routing engine 322, UI orchestration engine 323, and plugin orchestration engine 324. Layout management engine 321 generally uses information in a device-specific workflow definition to determine an order in which plugins, widgets, and the associated user interface components are displayed on a device. Composition and routing engine 322 generally renders the user interface on a device and instantiates one or more event handlers to route user interaction to the appropriate function or code module for processing. UI orchestration engine 323 is generally a data-driven engine that uses data input into an application to orchestrate events that are invoked within an application. Plugin orchestration engine 324 generally cooperates with shell core 340 to orchestrate communications between different plugins.

Common UI 330 generally includes cross-platform user interface components that are shared across different versions of a shell (e.g., shared across mobile shell 210, web shell 220, and desktop shell 230 in FIG. 2). As illustrated, common UI 330 includes a UI component library 332, which may include information defining the various shared user interface components that can be rendered on a device. A plugin can reference specific components defined in UI component library 332 in a definition of the visual layout or organization of the plugin. When shell UI framework 320 renders the plugin, shell UI framework 320 accesses UI component library 332 to obtain definitions of the common UI components and renders the plugin according to the obtained definition.

Shell core 340 generally hosts one or more modules that enable execution of applications within an application shell. As illustrated, shell core 340 includes a service integration module 342. Widgets and plugins hosted within a shell framework 305 may interact with various services 380 through, for example, service integration module 342 in shell core 340. As illustrated, the services that support execution of applications within a shell framework 305 may include a product-specific UI service 381, a widget/plugin repository 382, an application programming interface (API) service 383, and a data transfer service 384. Product-specific UI service 381 generally provides product-specific user interface data to an application executing in shell framework 305. As discussed in detail above, a shell framework 305 can interact with widget/plugin repository 382 to retrieve the appropriate version of a plugin and the widgets identified in a plugin configuration or definition for rendering on a user device. During execution of an application, the application may invoke one or more functions of a remote processing system represented by API service 383, which defines the functions that can be invoked by the application, the required and optional data inputs, and the type of data returned in response to the function call (if any). To invoke a function exposed by API service 383, a data transfer service 384 may provide a gateway between the application executing on a client device and the API service. The gateway may receive a request from a client device, generate and invoke a function call based on the received request, receive data from API service 383, and return the received data to the client device on which the shell framework 305 is executing.

Application utilities 350 generally include common utilities that may be implemented according to a code contract that is consistent across different shells (e.g., across mobile shell 210, web shell 220, and desktop shell 230 in FIG. 2) so that application utilities 350 work consistently across different platforms.

Data layer 360 generally stores data models and user data at a local device and delivers the data to a remote source. Data model 361 generally defines relationships between data objects that are used within an application. The definitions may include the names of variables, data types, and other information that defines a data object and the interactions between different data objects. Data store 362 may be a relational or non-relational database that stores user data according to one or more data models in data models 361. Caching mechanism 363 may orchestrate the transmission of data to a remote source for commitment to a remote database.

Foundation layer 370 generally includes modules that interact with device hardware and define the low-level behavior of a shell framework 305. As illustrated, foundation layer 370 includes a networking module 371, configuration module 372, resource loading module 373, and utilities module 374. Networking module 371 generally provides an interface through which an application executing within a shell framework 305 communicates with other computing devices. This interface may include, for example, functions that convert data into a bitstream that may be encapsulated into one or more packets for transmission to another device via a network interface, such as a wired interface, an 802.11 wireless interface, a cellular wireless interface, or other data transfer interfaces. Configuration module 372 generally configures the shell framework 305 for execution on a specific device. Resource loading module 373 allows an application executing within a shell framework to reserve resources (e.g., temporary and/or persistent memory, CPU time, etc.) on a device to allow for execution of the application. Utilities module 374 generally provides basic utilities that the shell framework 305 uses for error recovery, memory management.

Figure 4:
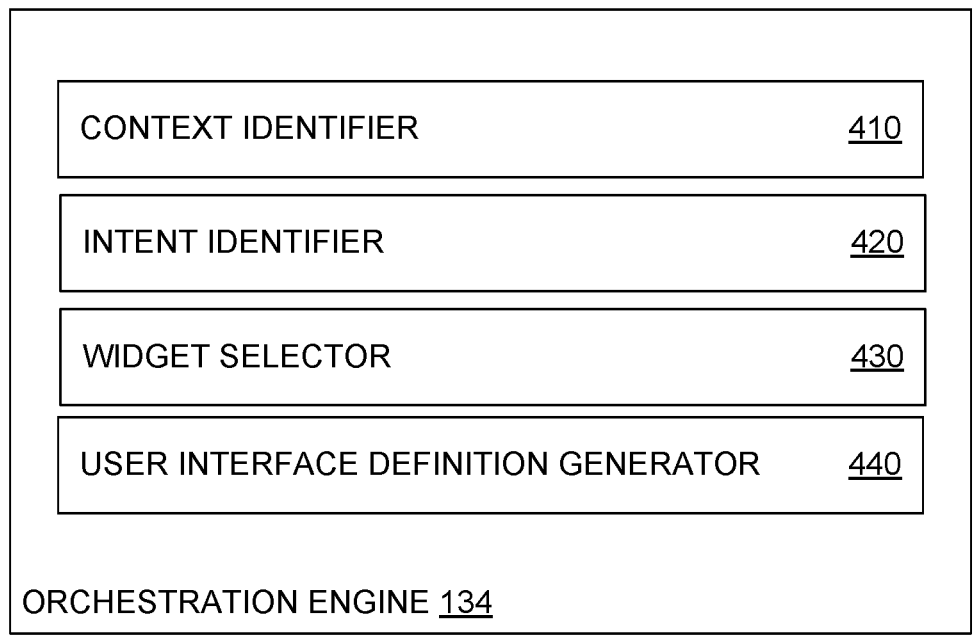
FIG. 4 illustrates an exemplary orchestration engine that generates a user interface for interacting with a step of a workflow, according to one embodiment.

FIG. 4 illustrates an example of an orchestration engine 134. As illustrated, orchestration engine 134 generally includes a context identifier 410, an intent identifier 420, a widget selector 430, and a user interface definition generator 440.

Context identifier 410 generally identifies information provided by a client device (e.g., client device 120 in FIG. 1), such as information about the requested step of a workflow, the capabilities of the client device, clickstream data, user preferences, user profile information, geographic location information, and information about cached data at the client device, to be used in identifying one or more plugins and/or widgets to add to a generated user interface definition.

Intent identifier 420 generally determines user intent based on context information identified by context identifier 410. In some embodiments, intent identifier 420 uses a model which is trained using machine learning algorithms in order to identify user intent. For example, association rule learning is a type of machine learning algorithm that may be used to discover correlations between variables in sets of data.

The model may be trained using historical context information of a plurality of users of the application, which is provided as input to machine learning algorithms that identify correlations between user segments and widgets that users in the user segments interacted with. In certain embodiments, correlations between user segments and widgets may be stored as vectors in the model, each vector being associated with a widget and representing the frequency of correlation between the widget and different characteristics present in the user context data for users who interacted with the widget. Intent identifier 420 may generate a vector based on the user's context information, the vector representing characteristics of the user's context data. Intent identifier 420 may then compare the user's vector to each of the vectors for the widgets using a similarity metric (e.g., cosine similarity), ranking each widget in order of relevance based on a degree of similarity. Intent identifier 420 may therefore determine user intent by identifying the widgets which are relevant to the user.

Note that, while certain methods of training the model are described herein (e.g., identifying statistical correlations between certain widgets and aspects of the context information of a plurality of users from historical data and storing correlations in vectors), other techniques may be employed without departing from the scope of the present disclosure. For example, correlations in the model may be stored as other data structures, such as matrices, rather than vectors. In some embodiments, predefined rules may also be employed as part of the intent identification and/or widget selection process. For example, a predefined rule may state that users with particular types of context information should be provided with certain widgets.

In one example, for a financial services application, if context identifier 410 determines based on clickstream data received from a client device that a user arrived at a particular application screen by clicking on a link to view a credit score, then intent identifier 420 may determine that the user's intent is to view a widget comprising the user's credit score based on a similarity between the user's context data (e.g., clicking on a link to view a credit score) and historical user context data associated with the credit score widget in the model. As another example, in a tax preparation application, if context identifier 410 determines based on user profile information received from the client device that a user owns a business, intent identifier 420 may determine that the user intends to view widgets related to business taxes based on correlations stored in the model.

Widget selector 430 generally selects widgets for inclusion on a user interface definition based, in part, on the user intent determined by intent identifier 420. Widget selector 430 may also reduce the available set of widgets based on the device capabilities of a client device, only selecting widgets which are compatible with the platform and capabilities of the client device, identified using the context information. For example, if a data entry workflow step is being executed on a computer that does not include image capture functionality (e.g., a desktop computer or a laptop computer that does not include a rear-facing camera), widget selector 430 can determine that the client device should not receive a user interface definition with references to widgets associated with image capture systems. In another example, because the context information received from client device may indicate the type of the client device (e.g., that the client device is a handheld computer, smartphone, tablet, desktop computer, laptop computer, etc.), widget selector 430 may determine that the client device should receive a user interface definition associated with the type of the client device. In further examples, widget selector 430 may select widgets based on, for example, predefined rules (e.g., that users with a particular intent should receive certain widgets), historical data (e.g., other users have interacted with particular widgets in similar contexts), and the like.

User interface definition generator 440 generally builds a user interface definition dynamically (e.g., comprising the widgets selected by widget selector 430), and provides the user interface definition to a client device for rendering and execution. By dynamically building a user interface with references to application logic that a user can execute, user interface definition generator 440 may generate applications where application logic is decoupled from the user interfaces used to interact with the application logic.

User interface definition generator 440 defines a user interface definition based on the widgets identified by widget selector 430 (e.g., because they are relevant to a workflow step a client device) and transmits the user interface definition to the client device. In some cases, the user interface definition generated by user interface definition generator 440 may include a sequence of widgets and an indication of the function that the user can invoke to proceed to the next step of the workflow. The user interface definition may additionally include versioning information for each widget included in the user interface definition. In some cases, if user interface definition generator 440 determines that client device has already cached the current version of one or more of the widgets, user interface definition generator 440 can include a reference to the current version of the cached widgets and a more detailed description of the widgets that are not cached at the client device or for which an outdated version is cached at the client device. Because the user interface components associated with a widget may already be cached at the client device, the user interface definition need not include a complete specification of the cached widgets.

Figure 5:
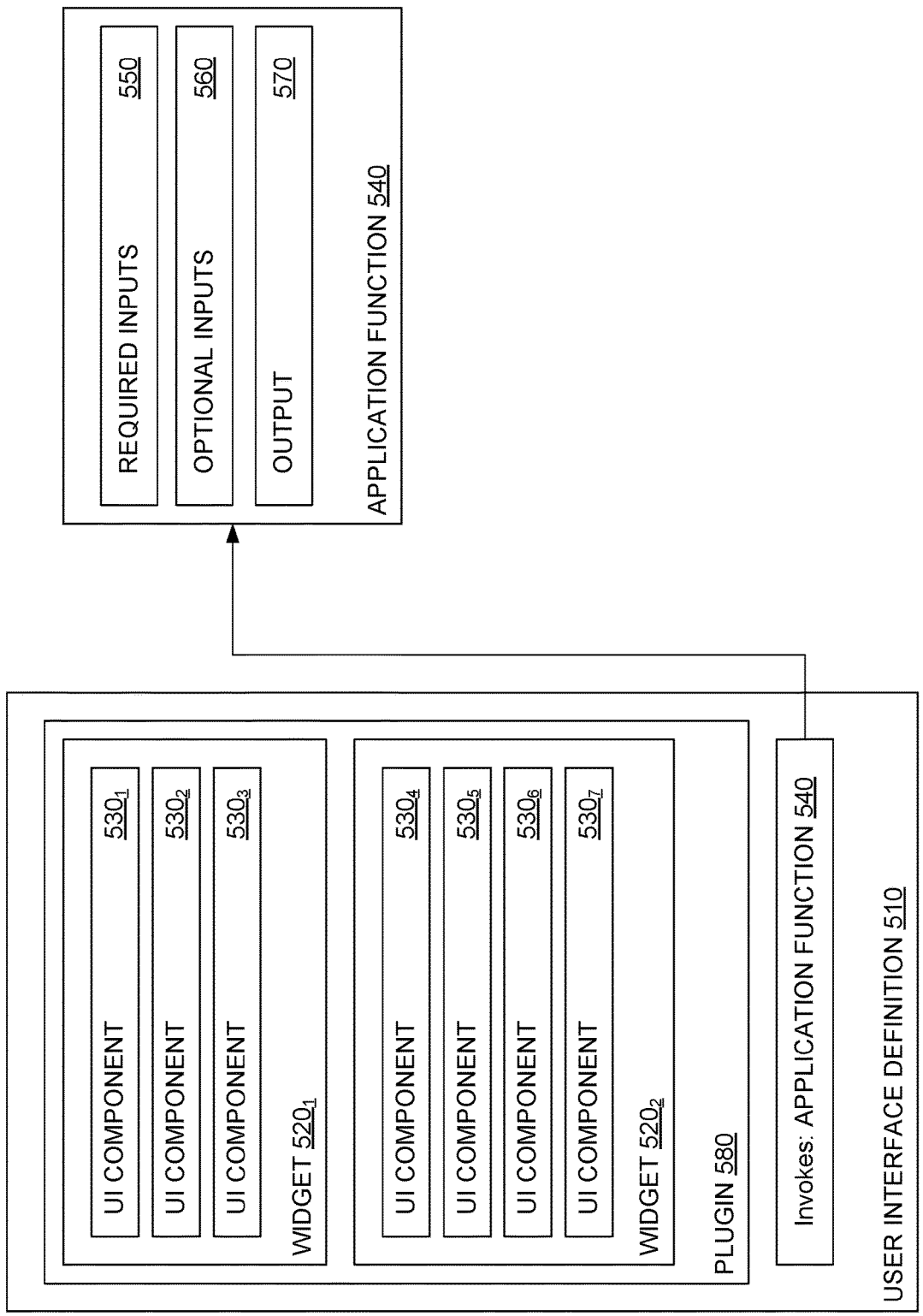
FIG. 5 illustrates an exemplary definition of a user interface definition and function definition, according to one embodiment.

FIG. 5 illustrates an exemplary user interface definition 510, according to an embodiment. As illustrated, user interface definition 510 includes a plugin 580 comprising a plurality of widgets 5201 and 5202, and a reference to the application function 540 that a user can invoke through the user interface defined by user interface definition 510. Each widget 520 generally includes a plurality of user interface components 530. As discussed, the user interface components 530 included in a widget 520 may be shared user interface components common to an application executing on any platform (e.g., any operating system and any device), user interface components common to a subset of platforms, user interface components native to a specific platform, or a combination thereof.

In some cases, the user interface definition 510 may further define a layout of the user interface to be displayed on a client device (such as client device 120 in FIG. 1). For example, user interface definition 510 may display each widget 520 sequentially according to an order defined by the one or more plugins (e.g., plugin 580) associated with each widget or based on relevance (e.g., determined by user orchestration engine 134 in FIG. 1). Because each plugin may define interactions and other relationships with other plugins, each plugin may include data identifying a rank or order in which the user interface components associated with the widgets are to be displayed to a user. For example, plugins associated with application navigation (e.g., a progress bar) may be ranked such that the widgets associated with those plugins and their associated user interface elements appear at the top of a display associated with a client device, and user interface components associated with other widgets may appear below the plugins associated with application navigation UI components. In some examples, if multiple plugins are provided to enable user input of data into an application (such as application 122 in FIG. 1), the user interface components may be ordered such that the user interface components associated with more user-friendly mechanisms for importing data into application appear before more time-intensive mechanisms for importing data. For example, user interface components for data entry through data extraction from a captured image or data entry via retrieval of document data from a remote source may appear in the user interface before user interface components for manual entry of the requested data.

As illustrated, user interface definition 510 identifies an application function 540 that a user can invoke through the generated user interface by interacting with one or more user interface components rendered by the application. Generally, the user interface components used to invoke an application function may be associated with an event handler that invokes the application function when an event occurs, such as a user clicking on a button, using a predefined set of keys to invoke the function, or other user interaction with a user interface component. As illustrated, application function 540 may be defined by a set of required inputs 550, optional inputs 560, and the generated output 570. Required inputs 550, optional inputs 560 (if any), and output 570 may each be defined as a set of variable names and associated data types for the required inputs 550, optional inputs 560, and output 570. To invoke application function 540, which may be a function exposed by API service 142 in FIG. 1, the application may invoke function 540 by providing at least the required inputs 550. After application server 140 processes the data received from client device 120 (e.g., the required inputs 550 and, if provided, the optional inputs 560), application server 140 can provide the generated output (if any) to application 122 for display on client device 120.

Figure 6:
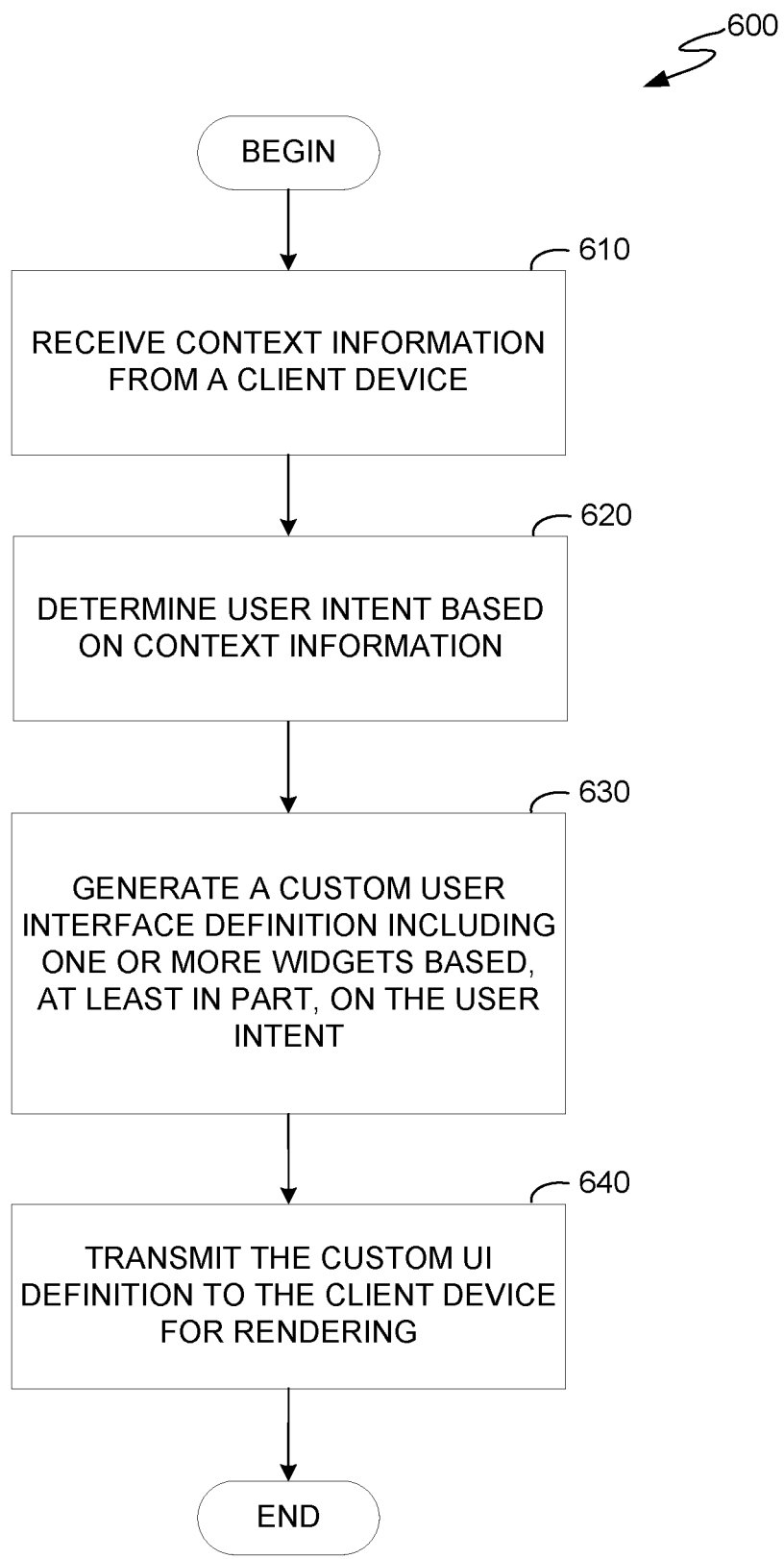
FIG. 6 illustrates example operations for generating a custom user interface definition, according to one embodiment.

FIG. 6 illustrates example operations 600 for generating a custom user interface definition. Operations 600 may be performed by a server, such as gateway server 130 in FIG. 1. As illustrated, operations 600 begin at step 610, where context information is received from a client device (e.g., client device 120 in FIG. 1). As discussed above, the context information received from client device may include, for example, information about the type of client device (e.g., whether the client device is a desktop/laptop computer, a tablet, a smartphone, or other device), the operating system executing on the client device, the types of connected devices and types of input that the client device can capture, version information of user interface components cached on the client device, clickstream data, browsing/search history, user preferences, user profile information, geographic location information, and the like.

At step 620, user intent is determined based on the context information received from the client device. For example, clickstream information may be received as part of the context information and may indicate that the user accessed a particular workflow step (e.g., a particular application screen) by interacting with a particular user interface element (e.g., clicking a link). For example, it could be determined that a user's intent is to view its credit score after the user clicks a link associated with viewing credit scores.

At step 630, a custom (e.g., platform-specific) user interface definition is generated based, at least in part, on the user intent determined at step 620. The custom user interface definition may include one or more user interface widgets associated with the step of the workflow determined based on context information. The custom user interface definition may omit plugins and/or widgets associated with capabilities not found on the client device. For example, the custom user interface definition may omit any plugin or widget related to an image capture capability if the client device does not include any image capture peripherals (e.g., a camera).

In some embodiments, the custom user interface definition may include an ordering of any included plugins or widgets based on relevance to the user. Relevance to the user may be determined by, for example, assigning relevance scores to widgets based on correlations between the user context information and predefined rules (e.g., rules may define that certain user context information is associated with certain widgets) and/or historical data (e.g., data about other similar users' interactions with user interface components). Relevance scores may be calculated, for example, based on correlations identified in a model trained using machine learning algorithms based on historical context data.

A relevance score may be representative of a degree of similarity between a user's context information and the historical context information that is correlated with a particular widget in the model. For example, the context information of the user may be stored as a vector, and may be compared using cosine similarity to vectors representing the historical context data associated with widgets (e.g., based on users with certain context information historically interacting with the widgets). The more similar a user's vector is to a widget's vector, the higher the relevance score will be for that widget.

In other examples, an order of plugins or widgets or user interface elements defined in a custom user interface definition may be based on a priority associated with each plugin or widget or user interface element. The priority information may be used to determine an order in which different user interface components or different widgets appear on a client device as well as layering information for the different user interface components. For example, the priority information for a navigation menu may specify that the navigation menu is to be rendered at the top of a screen for display on the client device and may specify that the navigation menu is to be overlaid on other user interface components displayed on the client device. In another example, priority information can be used to implicitly indicate a preferred method for performing a task in an application. For example, in a document ingestion workflow step of an application, the priority information may indicate that widgets associated with document ingestion via image capture are to be displayed at the top of the screen on the client device, and priority information for widgets associated with manual document ingestion may indicate that those widgets are to be displayed below image capture widgets, in an inactive tab, or otherwise in a form that indicates that document ingestion via image capture is the preferred method for ingesting data into the application.

In some embodiments, the custom user interface definition may also indicate the one or more functions that a user can invoke through the user interface associated with the step of the workflow (e.g., with invocation of the identified one or more functions bound to different events that may occur within the application). A client device can use the information about the one or more functions that a user can invoke to generate one or more event handlers for different user interface components specified in the custom user interface definition. For example, a navigation widget may include user interface components to move to a previous step of the workflow, to select a step in the workflow to navigate to, or move to a next step of the workflow. In an custom user interface definition that specifies two buttons and a drop-down list for navigation, the indication of functions may indicate that one button is to be used for moving to the previous step of the workflow, the drop-down list is to be used to select a step in the workflow to navigate to, and the other button is to be used for moving to the next step of the workflow. The button used for moving to the previous step of the workflow may be bound to an event handler that causes the user interface for the previous step of the workflow to be displayed when the button is clicked, and the button used for moving to the next step of the workflow may be bound to an event handler that causes the user interface for the next step of the workflow to be displayed when the button is clicked. To move to a specified step in the workflow, the drop-down list may be bound to an event handler that is triggered when the selection in the drop-down list changes.

At step 640, the custom user interface definition is transmitted to a client device for rendering and execution. In some cases, where the user interface components include user interface components common to a plurality of platforms, the client device may obtain graphical data for the user interface files from a user interface component repository (e.g., user interface component repository 170 in FIG. 1).

Figure 7:
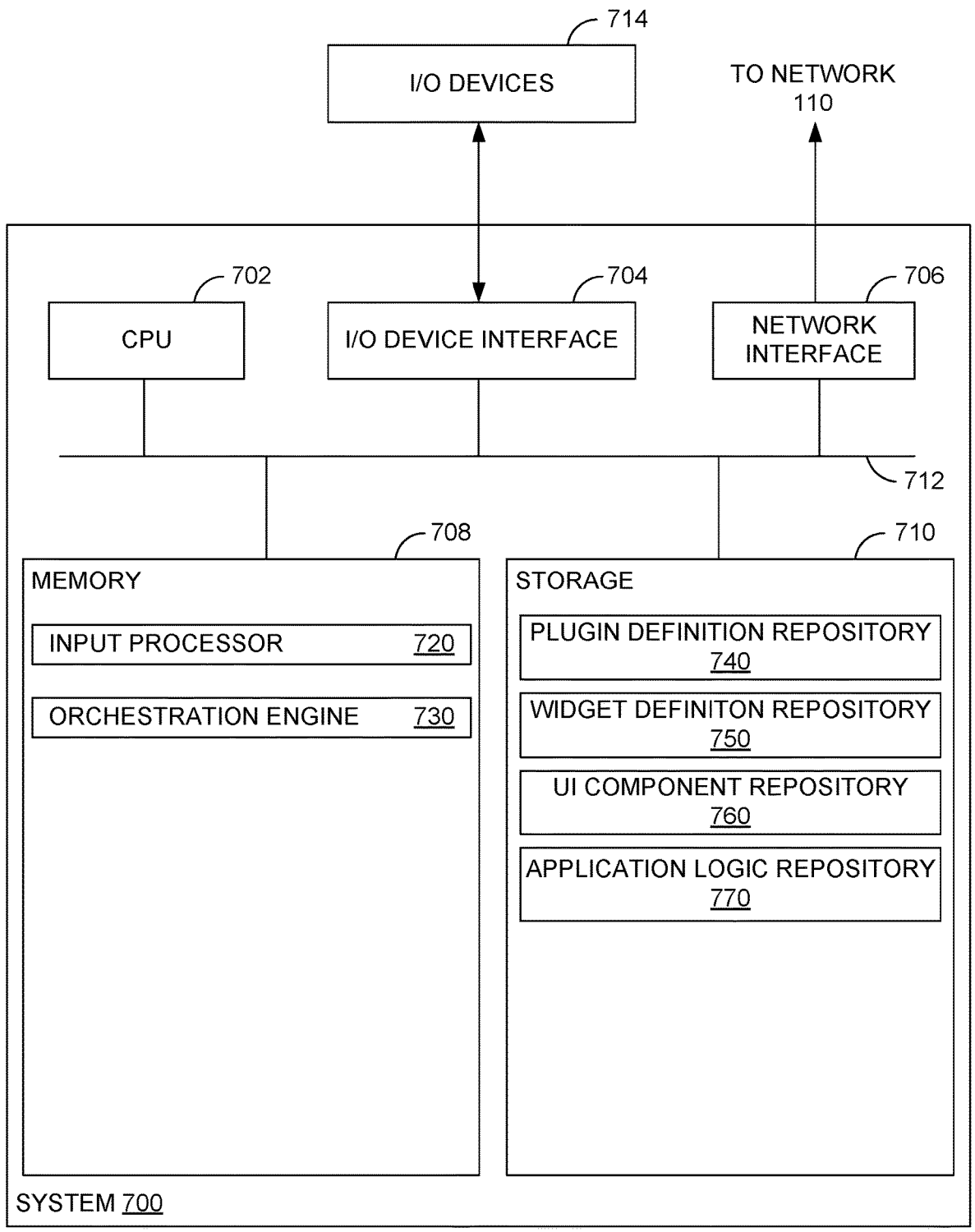
FIG. 7 illustrates an exemplary computing system with which embodiments of the present disclosure may be implemented.

FIG. 7 illustrates a system 700 (e.g., gateway server 130 in FIG. 1) with which embodiments of the present disclosure may be implemented. As shown, the system 700 includes a central processing unit (CPU) 702, one or more I/O device interfaces 704 which may allow for the connection of various I/O devices 714 (e.g., keyboards, displays, mouse devices, pen input, etc.) to the system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and the like. Additionally, the memory 708 is included to be representative of a random access memory or other types of volatile working memory. Storage 710 is included to be representative of a non-volatile data store, such as a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN).

As shown, memory 708 includes an input processor 720 and orchestration engine 730. The input processor 720 and orchestration engine may perform as described above with respect to input processor 132 and orchestration engine 134 of FIG. 1.

As shown, storage 710 includes a plugin definition repository 740, widget repository 750, UI component repository 760, and application logic repository 770, which may perform as described above with respect plugin definition repository 150, widget repository 160, user interface component repository 170, and application logic repository 180 (respectively) of FIG. 1.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for customizing deployment of an application to a user interface of a client device, comprising:
receiving context information from the client device;
determining device capabilities of the client device based on the context information;
determining one or more relevant widgets of a plurality of widgets based on the context information;
determining a set of widgets based on the device capabilities of the client device and the one or more relevant widgets;
using a model to determine a relevance score for each widget of the set of widgets based on the context information, wherein the model was trained based on historical context information of a plurality of users;
including the set of widgets in a custom user interface definition based on the relevance score for each widget of the set of widgets, wherein:
a first widget of the set of widgets corresponds to an image capture-based method of ingesting particular data;
a second widget of the set of widgets corresponds to a manual entry-based method of ingesting the particular data;
an order of the first widget and the second widget within the custom user interface definition indicates that the image capture-based method of ingesting the particular data is preferred over the manual entry-based method of ingesting the particular data; and
an order of the set of widgets is determined based, at least in part, on priorities associated with the set of widgets; and
transmitting, to the user interface of the client device, the custom user interface definition.

2. The method of claim 1, wherein the context information comprises at least one of: clickstream data of the client device; one or more user preferences; or user profile information.

3. The method of claim 1, further comprising:
comparing the context information to historical context information associated in the model with each of the plurality of widgets in order to determine a plurality of similarity metrics; and
selecting the set of widgets based, at least in part, on the similarity metrics.

4. The method of claim 3, wherein the order of the set of widgets within the custom user interface definition is determined based further on the relevance score for each widget of the set of widgets.

5. The method of claim 3, wherein the set of widgets is selected, at least in part, by applying one or more predetermined rules based on the context information.

6. The method of claim 3, wherein determining the plurality of similarity metrics comprises:
storing the context information in a vector; and using cosine similarity to determine the plurality of similarity metrics between the vector and each of a plurality of historical vectors representing the historical context information that is associated in the model with each of the plurality of widgets.

7. The method of claim 1, further comprising displaying, via the user interface of the client device, the set of widgets to enable a user to complete a step in a workflow on the client device.

8. A system, comprising:
a processor; and
a memory having instructions stored thereon which, when executed by the processor, performs an operation for customizing deployment of an application to a user interface of a client device, the operation comprising:
receiving context information from the client device;
determining device capabilities of the client device based on the context information;
determining one or more relevant widgets of a plurality of widgets based on the context information;
determining a set of widgets based on the device capabilities of the client device and the one or more relevant widgets;
using a model to determine a relevance score for each widget of the set of widgets based on the context information, wherein the model was trained based on historical context information of a plurality of users; and
including the set of widgets in a custom user interface definition based on the relevance score for each widget of the set of widgets, wherein:
a first widget of the set of widgets corresponds to an image capture-based method of ingesting particular data;
a second widget of the set of widgets corresponds to a manual entry-based method of ingesting the particular data;
an order of the first widget and the second widget within the custom user interface definition indicates that the image capture-based method of ingesting the particular data is preferred over the manual entry-based method of ingesting the particular data; and
an order of the set of widgets is determined based, at least in part, on priorities associated with the set of widgets; and
transmitting, to the user interface of the client device, the custom user interface definition.

9. The system of claim 8, wherein the context information comprises at least one of: clickstream data of the client device; one or more user preferences; or user profile information.

10. The system of claim 8, further comprising:
comparing the context information to historical context information associated in the model with each of the plurality of widgets in order to determine a plurality of similarity metrics; and
selecting the set of widgets based, at least in part, on the similarity metrics.

11. The system of claim 10, wherein the order of the set of widgets within the custom user interface definition is determined based further on the relevance score for each widget of the set of widgets.

12. The system of claim 10, wherein the set of widgets is selected, at least in part, by applying one or more predetermined rules based on the context information.

13. The system of claim 10, wherein determining the plurality of similarity metrics comprises:
storing the context information in a vector; and
using cosine similarity to determine the plurality of similarity metrics between the vector and each of a plurality of historical vectors representing the historical context information that is associated in the model with each of the plurality of widgets.

14. The system of claim 8, further comprising displaying, via the user interface of the client device, the set of widgets to enable a user to complete a step in a workflow on the client device.

15. A method for customizing deployment of an application to a user interface of a client device, comprising:
receiving context information from the client device;
determining device capabilities of the client device based on the context information;
determining one or more relevant widgets of a plurality of widgets based on the context information;
determining a set of widgets based on the device capabilities of the client device and the one or more relevant widgets;
using a model to determine a relevance score for each widget of the set of widgets based on the context information, wherein the model was trained based on historical context information of a plurality of users; and
including the set of widgets in a custom user interface definition based on the relevance score for each widget of the set of widgets, wherein:
a first widget of the set of widgets corresponds to an image capture-based method of ingesting particular data;
a second widget of the set of widgets corresponds to a manual entry-based method of ingesting the particular data;
an order of the first widget and the second widget within the custom user interface definition indicates that the image capture-based method of ingesting the particular data is preferred over the manual entry-based method of ingesting the particular data; and
an order of the set of widgets is determined based, at least in part, on priorities associated with the set of widgets; and
transmitting, to the user interface of the client device, the custom user interface definition.

16. The method of claim 15, wherein the context information comprises at least one of: clickstream data of the client device; one or more user preferences; or user profile information.

17. The method of claim 15, further comprising:
comparing the context information to historical context information associated in the model with each of the plurality of widgets in order to determine a plurality of similarity metrics; and
selecting the set of widgets based, at least in part, on the similarity metrics.

18. The method of claim 17, wherein the order of the set of widgets within the custom user interface definition is determined based further on the relevance score for each widget of the set of widgets.

19. The method of claim 17, wherein the set of widgets is selected, at least in part, by applying one or more predetermined rules based on the context information.

20. The method of claim 17, wherein determining the plurality of similarity metrics comprises:
storing the context information in a vector; and using cosine similarity to determine the plurality of similarity metrics between the vector and each of a plurality of historical vectors representing the historical context information that is associated in the model with each of the plurality of widgets.

* * * * *